United States Patent

Whittle et al.

[11] Patent Number: 5,228,721
[45] Date of Patent: Jul. 20, 1993

[54] PIPE FITTING

[75] Inventors: Alan J. Whittle; Robert B. Podnar, both of Wales, Australia

[73] Assignee: James Hardie Plumbing & Pipelines Pty. Limited, New South Wales, Australia

[21] Appl. No.: 878,037

[22] Filed: May 4, 1992

[51] Int. Cl.$^5$ .......................................... F16L 33/207
[52] U.S. Cl. ...................................... 285/23; 285/256; 285/259; 285/252
[58] Field of Search ................ 285/256, 259, 243, 242, 285/252, 149, 382.2, 23; 24/20 CW, 20 W, 129 W; 277/207 A, 208, 210

[56] References Cited

U.S. PATENT DOCUMENTS

| 216,851 | 6/1979 | Hofmann | 285/259 X |
| 858,575 | 7/1907 | Claflin | 285/259 X |
| 1,428,949 | 9/1922 | Eastman | 285/259 X |
| 3,837,686 | 9/1974 | Powell | 255/256 X |
| 4,229,028 | 10/1980 | Gray | 285/235 |
| 4,466,640 | 8/1984 | Van Houtte | 285/256 X |
| 4,564,222 | 1/1986 | Loker et al. | 285/243 |
| 4,784,409 | 11/1988 | Piechowiak | 285/286 X |
| 4,817,997 | 4/1989 | Ingram | 285/256 |
| 5,082,315 | 1/1992 | Saur | 285/256 |

FOREIGN PATENT DOCUMENTS

| 50468/72 | 6/1974 | Australia . | |
| 0160758 | 11/1985 | European Pat. Off. . | |
| 3425879 | 10/1985 | Fed. Rep. of Germany | 285/256 |
| 1284935 | 6/1977 | France | 285/242 |
| 0589249 | 6/1977 | Switzerland | 285/149 |
| 0648562 | 1/1951 | United Kingdom | 285/149 |
| 2104992 | 3/1983 | United Kingdom | 24/20 CW |

Primary Examiner—Dave W. Arola
Assistant Examiner—Heather Chun
Attorney, Agent, or Firm—Marshall & Melhorn

[57] ABSTRACT

A crimp ring fitting for connection to plastic or composite piping, the fitting including a spigot having one or more circumferentially extending ribs for engagement with the inner surface of the piping, a shoulder from which the spigot extends, a resilient sleeve extending coaxially with and spaced apart from the spigot, the sleeve terminating at one end in an inwardly directed flange adjacent the shoulder for retaining the sleeve about the spigot and at the other end in an outwardly directed flange, and a crimp ring slidably mounted over the sleeve for crimpable attachement of the fitting to the pipe, in use the outwardly directed flange preventing axial movement of the crimp ring along the pipe.

9 Claims, 1 Drawing Sheet

PIPE FITTING

BACKGROUND OF THE INVENTION

This invention relates to a crimp ring fitting for connection to plastic or composite piping and the like.

The invention has been developed primarily for use with polyethylene/aluminium composite piping and will be described hereinafter with reference to this particular use. It will be appreciated, however, that the invention is not limited to this particular field of use.

The principle of crimp ring pressure fittings has been established for many years and these are used extensively on hydraulic hoses and other plastic pipe fittings. However, it has been found that the existing crimp ring systems when used in particular on the composite pipes, tend to leak when subjected to cyclic temperature conditions.

Another disadvantage of existing crimp ring fittings is that the copper crimp ring is often damaged or distorted during transport making on site assembly all the more difficult. Furthermore, there is a tendency for the crimp rings, after crimping, to cut into and damage the pipe, particularly at the leading edge of the ring.

An object of the present invention is to provide a range of fittings which will overcome or at least ameliorate the discussed disadvantages of the prior art.

SUMMARY OF THE INVENTION

According to the invention there is provided a crimp ring fitting for connection to plastic or composite piping, the fitting including a spigot having one or more circumferentially extending ribs for engagement with the inner surface of the piping, a shoulder from which the spigot extends, a resilient sleeve extending coaxially with and spaced apart from said spigot, the sleeve terminating at one end in an inwardly directed flange adjacent the shoulder for retaining the sleeve about the spigot and at the other end in an outwardly directed flange, and a crimp ring slidably mounted over said sleeve for crimpable attachment of said fitting to said pipe, in use the outwardly directed flange preventing axial movement of the crimp ring along said pipe, particularly under cyclic temperature conditions.

Preferably the ribs have a non-damaging rounded profile.

In a preferred form the spigot also includes one or more tapered barbs for engagement with the inner surface of the piping. These barbs are preferably circumferentially extending with rounded extremities to prevent damage to the pipe.

In a preferred embodiment the sleeve is made from polybutylene and the fitting made of copper or brass.

BRIEF DESCRIPTION OF THE DRAWINGS

A preferred embodiment of this invention will now be described, by way of example only, with reference to the accompanying drawings in which.

DETAILED DESCRIPTION OF THE PREFERRED EMBODIMENT

Figure 1:
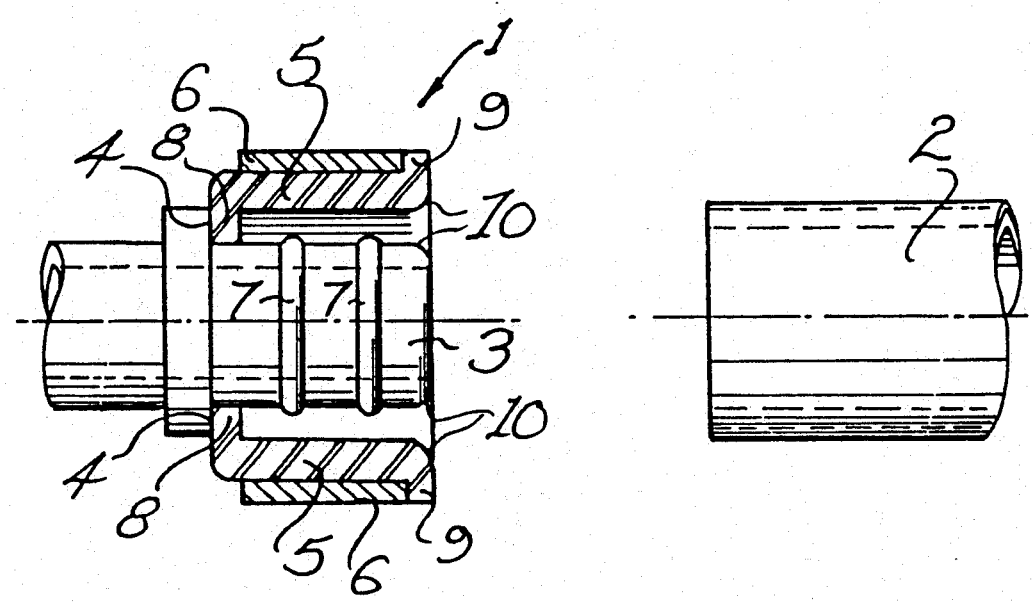
FIG. 1 is a schematic part sectioned longitudinal view of a part of a first embodiment crimp ring fitting according to the present invention and a composite pipe to which the fitting will engage.

Referring to FIG. 1 there is shown part of the fitting 1 adapted for connection to a composite pipe 2. The fitting 1 includes a spigot 3 extending from a shoulder 4 surrounded by a captive resilient sleeve 5 supporting a copper crimp ring 6. The shoulder is integral with the fitting body (not shown) which will vary according to its intended application.

The spigot 3 is made predominatly from copper or brass and in some cases from plastics such as, for example, PVC and includes two spaced apart circumferentially extending rounded ribs 7. The sleeve 5 is made from moulded polybutylene and has at one end an inwardly directed flange 8 which seats against the intersecting corner of shoulder 4 and spigot 3. An outwardly directed flange 9 extends from the distal end of sleeve 5 which serves to axially locate and retain the crimp ring 6. The external leading edge of the spigot 3 and the internal edges of sleeve 5 both have rounded lead-in portions 10 for ease of assembly to the pipe 2.

Figure 2:
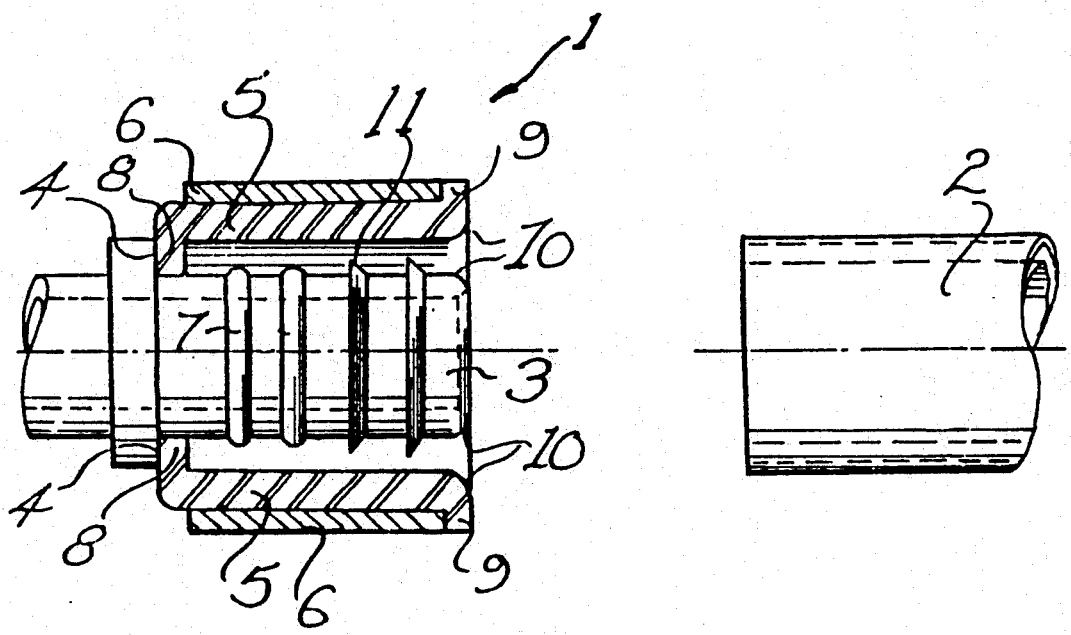
FIG. 2 is a schematic part sectioned longitudinal view of a second embodiment crimp ring fitting with a composite pipe to which the fitting will engage.

Referring now to FIG. 2 there is shown a preferred second embodiment of the invention. Like reference numerals have been used to denote corresponding features.

This embodiment is very similar to the first embodiment with the addition of two retaining ridges or annular barbs 11 disposed adjacent the leading edge of the spigot 3. The barbs taper inwardly toward the free end of the spigot 3 and may be blunted at their extremities to prevent damage to the pipe.

In use both the crimp ring fittings are provided pre-assembled as shown in the drawings with the crimp ring captive on sleeve 4. The pipe 2 is then presented to the fitting and inserted until it can go no further. At this point the connection is self supporting and the ring 5 can be crimped about the pipe by means of a conventional crimping tool.

In this way the rounded ribs 7 are forced into sealing engagement with the pipe wall whilst the polybutylene sleeve 5 ensures the pipe is gripped, but not damaged by the copper ring.

With the second embodiment fitting, compression of the crimp ring causes the barbs 11 to exert a radial load on the piping material which under tensile axial loads will resist removal of the pipe. The barbs are tapered inwardly toward the free end of spigot 3 to facilitate easy connection to the pipe 2. This embodiment has been found to be extremely effective at providing a sealing connection that can withstand high axial tensile loads.

If the connection is subjected to any form of thermal cycling, the resilience of the polybutylene sleeve prevents leaks from occurring. After crimping, the ring compresses the sleeve and another lip forms at the end adjacent the shoulder, which in conjunction with flange 9 holds the ring captive and prevents it creeping along the pipe, particularly under cyclic temperature conditions.

In another embodiment the spigot extends beyond the distal end of the sleeve 5 to locate and if necessary re-round the pipe which may be distorted after cutting a coiling.

One of the main advantages of the invention is that the fittings and copper crimp rings can be supplied as a single pre-assembled unit, thus simplifying assembly of the connections in the field. Furthermore, the sleeve serves to support the copper ring and help prevent damage or distortion of the ring during transport.

It is also envisaged however, that the fitting be supplied as unassembled parts for use in repair work and cases where, for example, crimp rings of different materials may be selected.

Another advantage of the invention is that the sleeve provides an electrically insulating barrier between the aluminium in the pipe and the brass or copper insert, thus reducing the likelihood of electrolytic corrosion.

Although the foregoing describes two preferred embodiments of the invention, modifications can be made thereto without departing from the scope of the invention.

I claim:

1. A crimp ring fitting for connection to plastic or composite piping, the fitting comprising: a spigot having at least one circumferentially extending raised ribs for engagement with an inner surface of the piping; a shoulder from which the spigot extends; a resilient sleeve extending coaxially with and spaced apart from said spigot, the sleeve having a uniform inner surface and a uniform outer surface, an inwardly directed flange perpendicular to the inner surface at an end adjacent and engaging the shoulder and spigot for retaining the sleeve about the spigot, and an outwardly directed flange perpendicular to the outer surface at the other end; and a crimp ring slidably mounted over said sleeve for crimpable attachment of said fitting to said pipe, whereby the outwardly directed flange prevents axial movement of the crimp ring along said pipe.

2. A crimp ring fitting according to claim 1 wherein the circumferentially extending ribs have a rounded profile whereby a seal is formed without damaging the piping.

3. A crimp ring fitting according to claim 1 wherein the spigot has at least one axially tapered external barbs for engagement with the inner surface of said piping.

4. A crimp ring fitting according to claim 3 wherein the barbs are circumferentially extending.

5. A crimp ring fitting according to claim 3 wherein the taper of said barbs is directed opposite said shoulder to facilitate connection to and resist removal from said piping.

6. A crimp ring fitting according to claim 5 wherein the barbs include blunted edges for engaging the inner surface of the piping.

7. A crimp ring fitting according to claim 1 wherein the sleeve is made from polybutylene.

8. A crimp ring fitting according to claim 1 that is pre-assembled prior to use wherein the crimp ring is retained on the fitting by the resilient sleeve.

9. A crimp ring fitting for connection to plastic or composite piping, the fitting comprising:

a spigot having at least one circumferentially extending raised ribs for sealably engaging an inner surface of the piping;

a fitting body shoulder from which said spigot extends;

a resilient sleeve extending coaxially with and spaced apart from said spigot, said sleeve including an inner end with a radially inwardly directed flange having a surface engaging said shoulder and an edge retainably engaging said spigot, and an outer end with an outwardly directed flange; and a crimp ring slidably mounted over said sleeve for crimpable attachment of said fitting to said pipe, whereby the outwardly directed flange axially locates and retains said crimp ring and the inwardly directed flange retains said sleeve about said spigot.

* * * * *